Figure 1:
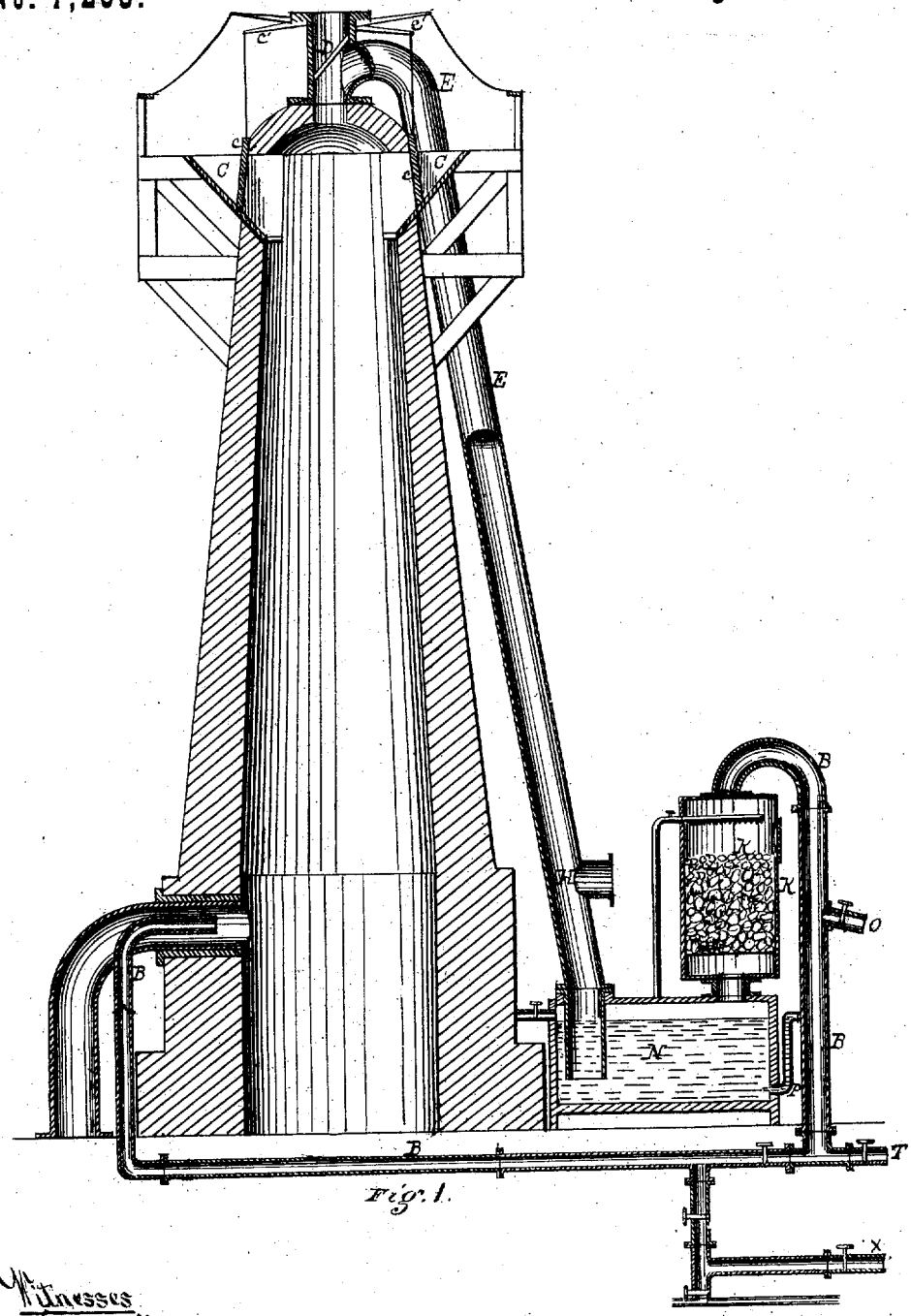

2 Sheets—Sheet 1.

J. H. CONNELLY & J. McLURE.

PROCESS OF COLLECTING AND PURIFYING FURNACE GASES.

No. 7,268. Reissued Aug. 22, 1876.

Witnesses
Robt Ames
Claudius L Parker

Inventors: Joseph H. Connelly,
John McLure,
by George H. Christy
their Atty.

THE NORRIS PETERS CO., WASHINGTON, D. C.

2 Sheets—Sheet 2.
J. H. CONNELLY & J. McLURE.
PROCESS OF COLLECTING AND PURIFYING FURNACE GASES.
No. 7,268. Reissued Aug. 22, 1876.
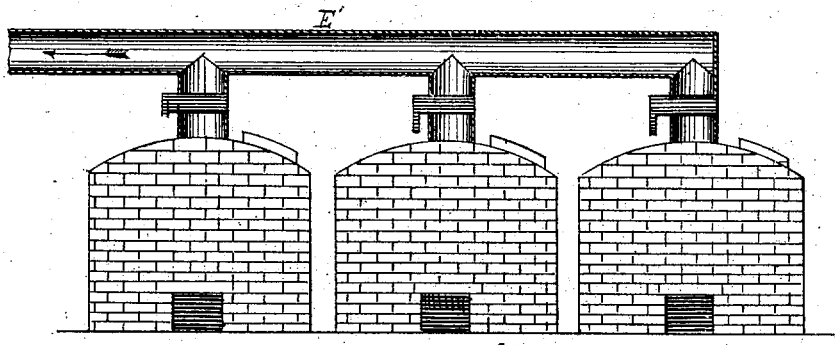
Fig. 2
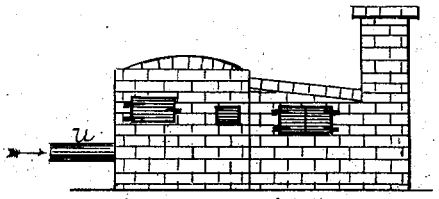
Fig. 4.
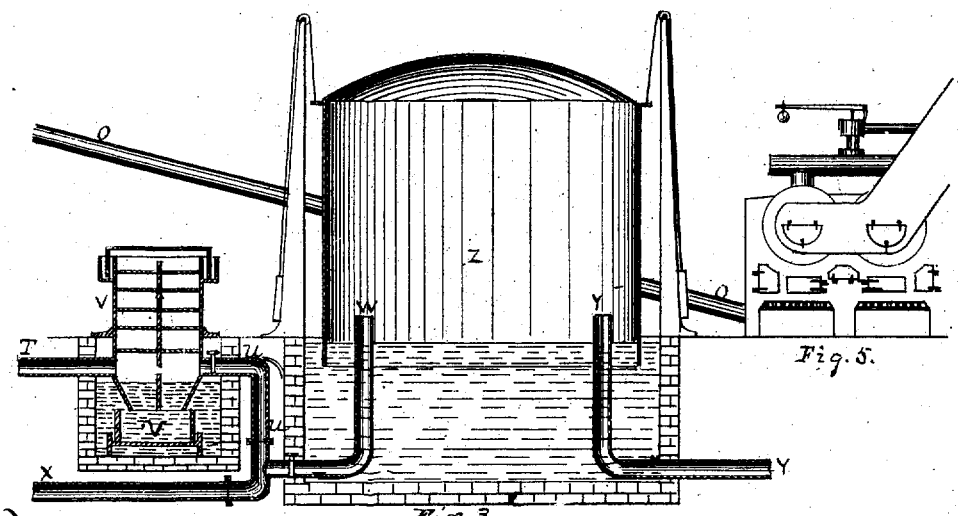
Fig. 5.
Fig. 3.
Witnesses
Robt Sims
Claudius L. Parker
Inventors: Joseph H. Connelly
John McLure
by George H. Christy
their Att'y.
THE NORRIS PETERS CO., WASHINGTON, D. C.

UNITED STATES PATENT OFFICE.

JOSEPH H. CONNELLY, OF NEW BRIGHTON, PENNSYLVANIA, AND JOHN McLURE, OF WHEELING, WEST VIRGINIA, ASSIGNORS TO THE SMOKE-CONSUMING, HEAT, AND GAS-LIGHT COMPANY, OF PITTSBURG, PA.

IMPROVEMENT IN PROCESSES OF COLLECTING AND PURIFYING FURNACE-GASES.

Specification forming part of Letters Patent No. 103,572, dated May 31, 1870; reissue No. 7,268, dated August 22, 1876; application filed May 31, 1876.

*To all whom it may concern:*

Be it known that we, JOSEPH H. CONNELLY, formerly of Wheeling, West Virginia, now of New Brighton, Beaver county, Pennsylvania, and JOHN McLURE, of Wheeling, Ohio county, West Virginia, have invented a new and useful improvement in process of, and apparatus for, collecting the mixed gases passing off from furnaces, and from coke-ovens, wherein bituminous coal is used, separating and purifying the carbonic oxide, hydrogen, and carbonaceous gases therein contained from other gases, or the condensed products thereof, and applying the same to aid the combustion in said furnaces, and also in puddling-furnaces, and also preparing the same for illuminating purposes; and we do hereby declare the following to be a full, clear, and exact description of the said invention, such as will enable others skilled in the art to make and use the same, reference being had to the accompanying drawings in two sheets, (like letters indicating like parts,) making a part of this specification, in which—

Figure 1, Sheet 1, illustrates, by a view chiefly in vertical section, our improvements as applied to a furnace-stack or cupola. Fig. 2, Sheet 2, illustrates the mode of collecting the gases from coke-ovens. Fig. 3 illustrates, by a view in vertical section, apparatus suitable for further treating the gas to make it ready for use; and Figs. 4 and 5 illustrate the manner of using the gas in puddling and boiler furnaces for heating purposes.

In applying our invention to a furnace we inclose the top of the furnace or cupola, and insert therein a pipe, E, for conveying or conducting the gases and substances given off therefrom over to a condenser, N. In applying it to coke-ovens a similar pipe, E′, is inserted in the top of the coke-oven, through which, in like manner, the gases and substances are drawn off from the ovens by means of an exhaust-pump or fan arranged, as at H, in the line of communication from the furnace or coke-ovens to the condenser N. This pump or fan is not shown in detail, as we deem it unnecessary so to do. The said gases and substances pass off or are forced into the water-condenser N, wherein the substances, such as tar, &c., are separated from the gases, and thence the gases pass into and through the scrubber or washer K, which further separates the substances from the gases, the substances, such as tar, &c., returning back into the condenser, from which they pass off through a bent pipe, P. The gases are thence forced through pipes B and O to a boiler-fire, as illustrated in Fig. 5, or by a pipe, B, to a furnace-fire, Fig. 1, or to both, to aid in the combustion thereof; or the gas may be still further purified by being forced, by pipes B T, through lime or other purifier V, as shown in the drawing, before being conveyed to the cupola-fire, as described; and it may then also be conducted to and used in a puddling-furnace by a pipe, U, as shown in Fig. 4.

To prepare an illuminating-gas from the furnace or coke-oven gases, the purifier V is employed, as set forth, so as to separate the carbonic oxide and hydrogen from the other gases therein contained, as well as from other impurities, after which the gases so separated are forced and conveyed along through the pipes U W, Fig. 3, into the gas-holder Z, where they are sufficiently enriched for illuminating purposes, by the addition thereto of cannel-coal gas or oil-gas through the pipe X, and from which holder they are taken, to be consumed, by suitable pipe Y.

As we do not confine ourselves to any particularly-constructed furnace or coke-ovens, or apparatus for manufacturing gas, and each and all of them, separately considered, being so well known to those skilled in the matters to which they relate, we deem it unnecessary to describe them in detail further than above done and shown in the drawing; but having inclosed the top of the furnace or cupola, as before stated, to provide for supplying the furnace or cupola with coal, metal, lime, &c., we construct two or more hoppers, C, to, around, or about and near its top, said hoppers having their bottoms considerably inclined toward the furnace, and opening therein by means of sliding doors, c, raised and lowered by levers $c'$, attached thereto and to the furnace or frames of hoppers. So, to charge the furnace, fill said hoppers and raise said doors, when they will simultaneously discharge themselves.

The construction and operation of said hoppers we claim as a part of our invention.

To provide for the escape of said gases and substances when, for any reason, it is not desired to appropriate them for the purposes herein described, we have a door, D, made either in the top of cover of the top of the furnace or in the pipe E, near where it enters the furnace.

The pipes and connections described are to be furnished with a suitable arrangement of cocks or valves for directing the flow of gas as may be desired.

The dimensions and capacities of the pipe E, exhaust H, condenser N, scrubber K, purifier V, holder Z, and their connecting and discharging pipes, will be determined by the amount of gases and substances to be thus utilized, which can be readily done by those conversant with the matter to which this relates.

We do not claim as new of themselves these parts or pieces of machinery thus designated and above described, but only the processes carried out by their operation, and the combinations thereof, as hereinafter set forth; and we claim that the mode of using said gases and substances will effect a saving of what would otherwise be lost, thereby economizing fuel, improving the quality of iron, saving the tar, and aiding in providing an illuminating-gas.

We claim herein as our invention—

1. The process of utilizing the gases and substances which pass off from furnaces, cupolas, stacks, and coke-ovens, by drawing or conveying them off by the means substantially as herein described, separating said substances from said gases, substantially as herein described, and then applying said gases or the carbonic oxide and hydrogen obtained, by the means substantially as herein described, to aid and assist the combustion in the fires of furnaces, substantially as set forth.

2. The process of utilizing the gases and substances which pass off from furnaces, cupolas, stacks, and coke-ovens, by drawing or conveying them off by the means substantially as herein described, separating said substances from said gases, substantially as herein described, and then enriching the carbonic oxide and hydrogen obtained by the addition thereto of a coal or oil gas, to adapt it for illuminating purposes, substantially as set forth.

3. The furnace or coke-oven pipe, leading from a close cover to or through suitable condensing and purifying apparatus, and in combination with a fan or exhaust for drawing off and utilizing the otherwise waste gases, substantially as set forth.

4. The combination of the furnace or coke-oven pipe, a condenser, N, scrubber K, purifier V, holder Z, and pipe X, for supplying to the contents of the holder a gas rich in carbon, substantially as and for the purpose set forth.

JOSEPH H. CONNELLY.
JNO. McLURE.

Witnesses:
PHILIP BENTEL,
JNO. F. BENTEL.